United States Patent
Akkarakaran et al.

(10) Patent No.: US 12,356,427 B2
(45) Date of Patent: Jul. 8, 2025

(54) BANDWIDTH PART CONFIGURATION FOR SIDELINK COMMUNICATION

(71) Applicant: QUALCOMM Incorporated, San Diego, CA (US)

(72) Inventors: Sony Akkarakaran, Poway, CA (US); Tao Luo, San Diego, CA (US); Jung Ho Ryu, Fort Lee, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/453,757

(22) Filed: Aug. 22, 2023

(65) Prior Publication Data

US 2023/0397220 A1    Dec. 7, 2023

Related U.S. Application Data

(63) Continuation of application No. 16/920,124, filed on Jul. 2, 2020, now Pat. No. 11,849,459.

(Continued)

(51) Int. Cl.
*H04W 72/23*    (2023.01)
*H04L 5/00*    (2006.01)
*H04W 72/0453*    (2023.01)

(52) U.S. Cl.
CPC ............ *H04W 72/23* (2023.01); *H04L 5/001* (2013.01); *H04L 5/0094* (2013.01); *H04W 72/0453* (2013.01)

(58) Field of Classification Search
CPC ............ H04W 72/042; H04W 72/0453; H04L 5/001; H04L 5/0094

See application file for complete search history.

(56) References Cited

U.S. PATENT DOCUMENTS 11,265,742 B2    3/2022    Nagaraja et al.
11,564,234 B2    1/2023    Jiang et al.
(Continued)

FOREIGN PATENT DOCUMENTS

WO    2018204884 A1    11/2018
WO    2018213287    11/2018

OTHER PUBLICATIONS

Huawei, et al., "Frame and Slot Structure for Sidelink", 3GPP Draft, 3GPP TSG RAN WG1 Meeting #97, R1-1906594, 3rd Generation Partnership Project (3GPP), Mobile Competence Centre, 650, Route Des Lucioles, F-06921 Sophia-Antipolis Cedex, France, vol. RAN WG1. No. Reno. USA, May 13, 2019-May 17, 2019, May 13, 2019 (May 13, 2019), XP051728045, 5 pages, Section 4.

(Continued)

*Primary Examiner* — Kevin C. Harper
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of one or more bandwidth part (BWP)-specific access link parameters and one or more BWP-specific sidelink parameters. The UE may perform at least one of access link communication with a base station based at least in part on the one or more BWP-specific access link parameters, or sidelink communication with another UE based at least in part on the one or more BWP-specific sidelink parameters. Numerous other aspects are provided.

30 Claims, 8 Drawing Sheets

Related U.S. Application Data

(60) Provisional application No. 62/871,612, filed on Jul. 8, 2019.

(56) References Cited

U.S. PATENT DOCUMENTS

| | | | |
|---|---|---|---|
| 11,849,459 B2* | 12/2023 | Akkarakaran | H04L 5/0064 |
| 2018/0049203 A1 | 2/2018 | Xue et al. | |
| 2018/0183551 A1 | 6/2018 | Chou et al. | |
| 2019/0044689 A1 | 2/2019 | Yiu et al. | |
| 2019/0149380 A1 | 5/2019 | Babaei et al. | |
| 2019/0150200 A1 | 5/2019 | Chen et al. | |
| 2019/0190681 A1 | 6/2019 | Li et al. | |
| 2019/0215756 A1 | 7/2019 | Park et al. | |
| 2019/0254110 A1* | 8/2019 | He | H04L 41/0896 |
| 2019/0349904 A1 | 11/2019 | Kwak et al. | |
| 2020/0106647 A1 | 4/2020 | Chen et al. | |
| 2020/0259627 A1 | 8/2020 | Loehr et al. | |
| 2021/0014833 A1 | 1/2021 | Akkarakaran | |
| 2021/0160876 A1 | 5/2021 | Osawa et al. | |
| 2021/0195593 A1 | 6/2021 | Shen et al. | |
| 2021/0337544 A1 | 10/2021 | Wang et al. | |
| 2022/0007364 A1 | 1/2022 | Hou et al. | |
| 2022/0095277 A1 | 3/2022 | Aiba et al. | |

OTHER PUBLICATIONS

International Preliminary Report on Patentability—PCT/US2020/040797, The International Bureau of WIPO—Geneva, Switzerland, Jan. 20, 2022.

International Search Report and Written Opinion—PCT/US2020/040797—ISA/EPO—Oct. 5, 2020.

Partial Translation of Publication of Chinese Application 201811524640.7.

Publication of Chinese Application 201811524640.7, Feb. 25, 2020, pp. 7-8.

* cited by examiner

BANDWIDTH PART CONFIGURATION FOR SIDELINK COMMUNICATION

CROSS-REFERENCE TO RELATED APPLICATIONS

This patent Application is a continuation of U.S. patent application Ser. No. 16/920,124, filed on Jul. 2, 2020, entitled "BANDWIDTH PART CONFIGURATION FOR SIDELINK COMMUNICATION," which claims priority to U.S. Provisional Patent Application No. 62/871,612, filed on Jul. 8, 2019, entitled "BANDWIDTH PART CONFIGURATION FOR SIDELINK COMMUNICATION," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for bandwidth part (BWP) configuration for sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In a wireless network, two or more subordinate entities, such as two or more UEs or two or more integrated access and backhaul (IAB) nodes, may communicate with each other using sidelink communications. In some cases, a UE may communicate on an access link with a BS based at least in part on one or more cell-specific parameters associated with the BS. In some cases, the BS may configure the UE with one or more bandwidth part (BWP) specific parameters for communication on the access link. The one or more BWP-specific parameters may be modified versions of the cell-specific parameters, may be other parameters, or a combination thereof. This permits the BS to configure the UE with different sets of parameters, which may be based at least in part on capabilities of the UE, or on operational scenarios of the UE (such as low-power operation or idle operation), among other possibilities. However, the BWP-specific parameters may not be optimized for, or configured in consideration of, sidelink operation of the UE, which may result in inefficient sidelink operation.

SUMMARY

In some aspects, a method of wireless communication, performed by a user equipment (UE), may include receiving an indication of a plurality of bandwidth part (BWP) configurations. The method may include receiving an indication of one or more BWP configurations of the plurality of BWP configurations, the one or more BWP configurations indicating one or more BWP-specific access link parameters and one or more BWP-specific sidelink parameters; and performing. The method may include performing at least one of access link communication with a base station (BS) based at least in part on the one or more BWP-specific access link parameters, or sidelink communication with another UE based at least in part on the one or more BWP-specific sidelink parameters.

In some aspects, a UE for wireless communication may include memory and one or more processors operatively coupled to the memory. The memory and the one or more processors may be configured to receive an indication of a plurality of BWP configurations. The memory and the one or more processors may be configured to receive an indication of one or more BWP configurations of the plurality of BWP configurations, the one or more BWP configurations indicating one or more BWP-specific access link parameters and one or more BWP-specific sidelink parameters. The memory and the one or more processors may be configured to perform at least one of access link communication with a BS based at least in part on the one or more BWP-specific access link parameters, or sidelink communication with another UE based at least in part on the one or more BWP-specific sidelink parameters.

In some aspects, a non-transitory computer-readable medium may store one or more instructions for wireless communication. The one or more instructions, when executed by one or more processors of a UE, may cause the one or more processors to receive an indication of a plurality of BWP configurations. The one or more instructions, when executed by one or more processors of a UE, may cause the one or more processors to receive an indication of one or more BWP configurations of the plurality of BWP configurations, the one or more BWP configurations indicating indicating one or more BWP-specific access link parameters and one or more BWP-specific sidelink parameters. The one or more instructions, when executed by one or more processors of a UE, may cause the one or more processors to perform at least one of access link communication with a BS based at least in part on the one or more BWP-specific access link parameters, or sidelink communication with another UE based at least in part on the one or more BWP-specific sidelink parameters.

In some aspects, an apparatus for wireless communication may include means for receiving an indication of a plurality of BWP configurations. The apparatus may include means for receiving an indication of one or more BWP configurations of the plurality of BWP configurations, the one or more BWP configurations indicating one or more BWP-specific access link parameters and one or more BWP-specific sidelink parameters. The apparatus may include means for performing at least one of access link communication with a BS based at least in part on the one or more BWP-specific access link parameters, or sidelink communication with another apparatus based at least in part on the one or more BWP-specific sidelink parameters.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
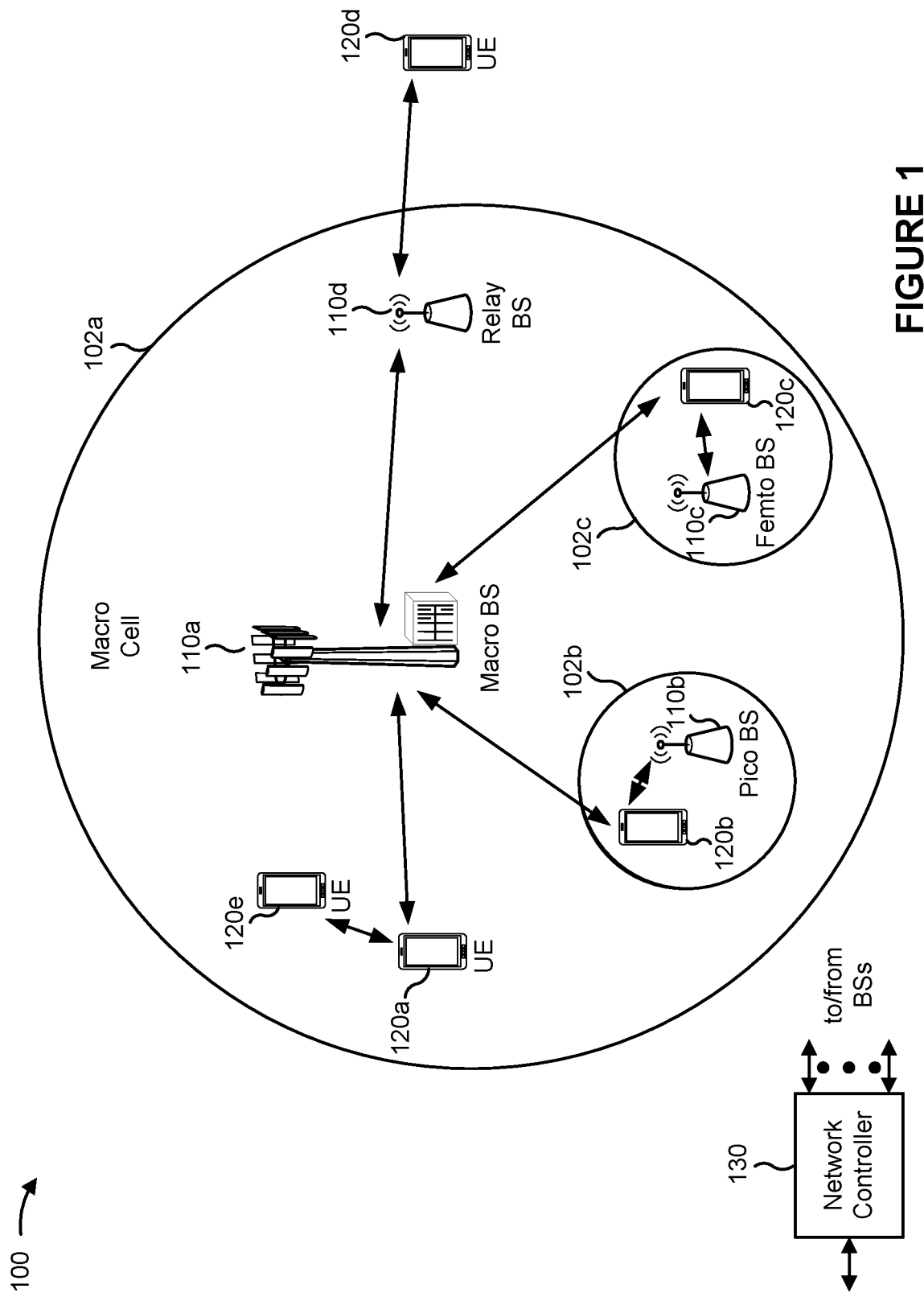
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including NR technologies.

In a wireless network, two or more subordinate entities, such as two or more user equipment (UEs), may communicate with each other using sidelink communications. Real-world applications of such sidelink communications may include public safety, proximity services, UE-to-network relaying, device-to-device (D2D) communications, vehicle to everything (V2X) communications, vehicle to vehicle (V2V) communications, Internet of Everything (IoE) communications, Internet of things (IoT) communications, mission-critical mesh communications, or various other suitable applications. "Sidelink communication" may refer to a communication that is transmitted from one subordinate entity to another subordinate entity (for example, UE-to-UE or IAB node-to-IAB node) without relaying that communication through a scheduling entity (for example, a base station (BS) or an IAB donor), even though the scheduling entity may be utilized for scheduling or control purposes. In some examples, a sidelink communication may be transmitted using a licensed frequency spectrum, an unlicensed frequency spectrum (such as an industrial, scientific and medical (ISM) radio band, (for example, 5 GHz), that is reserved for purposes other than cellular communication such as Wi-Fi).

In some cases, a UE may communicate on an access link with a BS based at least in part on one or more cell-specific parameters associated with the BS, such as synchronization signal block periodicity and quantities, or slot format configuration, among other examples. In some cases, the BS may configure the UE with one or more bandwidth part (BWP) specific parameters for communication on the access link. The one or more BWP-specific parameters may be modified versions of the cell-specific parameters, may include other parameters, or a combination thereof. This permits the BS to configure the UE with different sets of parameters, which may be based at least in part on capabilities of the UE, or on operational scenarios of the UE (such as low-power operation or idle operation), among other examples. However, the BWP-specific parameters may not be optimized for, or configured in consideration of, sidelink operation of the UE, which may result in inefficient sidelink operation.

Some aspects described herein provide techniques and apparatuses for BWP configuration for sidelink communication. In some aspects, a UE may receive an indication of one or more BWP configurations. The one or more BWP configurations may include an access link BWP configuration and a sidelink BWP configuration, a combined or joint access link and sidelink BWP configuration, or a combination thereof. The access link BWP configuration may include one or more BWP-specific access link parameters, and, similarly, the sidelink BWP configuration may include one or more BWP-specific sidelink parameters. If a combined access link and sidelink BWP configuration is indicated, the combined access link and sidelink BWP configuration may include one or more BWP-specific access link parameters as well as one or more BWP-specific sidelink parameters. The UE may perform access link communication based at least in part on the one or more BWP-specific access link parameters, and may perform sidelink communication based at least in part on the one or more BWP-specific sidelink parameters.

Particular aspects of the subject matter described in this disclosure can be implemented to realize one or more of the following potential advantages. In some examples, the described techniques can enable a UE to be configured with different sets of parameters for access link communication and sidelink communication. This permits one or more BWP-specific access link parameters to be optimized for, or configured in consideration of, access link operation of the UE, while permitting one or more BWP-specific sidelink parameters to be optimized for, or configured in consideration of, sidelink operation of the UE. Such optimizations or considerations may increase the efficiency of access link operation and sidelink operation of the UE or may increase flexibility in configuring access link operation and sidelink operation of the UE, among other advantages.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, D2D communications, a V2X protocol (for example, which may include a V2V protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
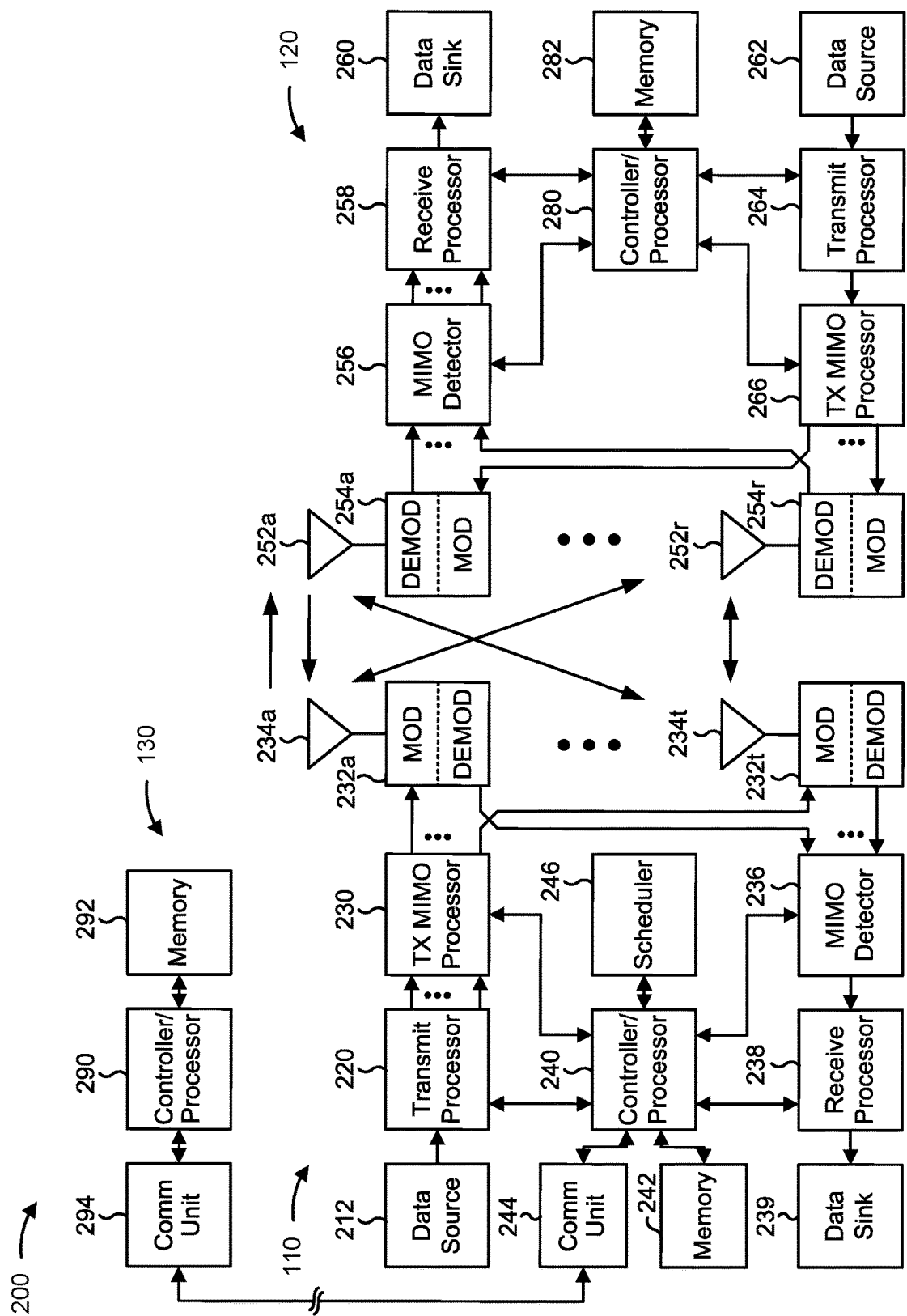
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with BWP configuration for sidelink communication, as described in more detail elsewhere herein. For example, controller/processor 240 of base station 110, controller/processor 280 of UE 120, or any other component(s) of FIG. 2 may perform or direct operations of, for example, process 600 of FIG. 6, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving an indication of a plurality of BWP configurations, means for receiving an indication one or more BWP configurations of the plurality of BWP configurations, the one or more BWP configurations indicating one or more BWP-specific access link parameters and one or more BWP-specific sidelink parameters, means for performing at least one of access link communication with a BS 110 based at least in part on the one or more BWP-specific access link parameters, or sidelink communication with another UE 120 based at least in part on the one or more BWP-specific sidelink parameters, or the like, or combinations thereof. In some aspects, such means may include one or more components of UE 120 described in connection with FIG. 2.

Figure 3A:
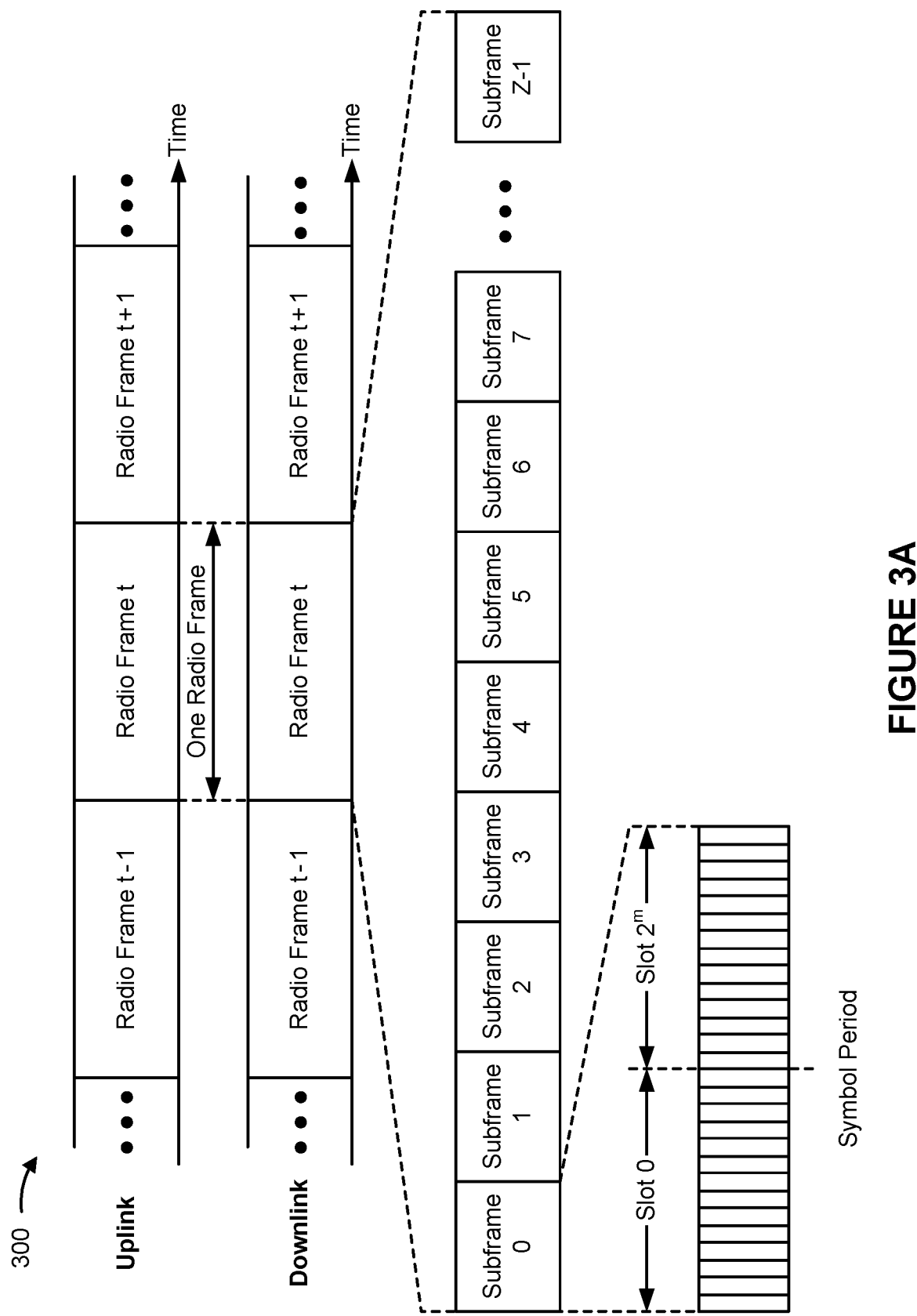
FIG. 3A is a block diagram illustrating an example frame structure for use in a wireless network in accordance with various aspects of the present disclosure.

FIG. 3A is a block diagram illustrating an example frame structure 300 for use in a wireless network in accordance with various aspects of the present disclosure. For example, frame structure 300 may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is numerology used for a transmission, such as 0, 1, 2, 3, 4, or the like, or combinations thereof). Each slot may include a set of L symbol periods. For example, each slot may include fourteen symbol periods (for example, as shown in FIG. 3A), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, or the like, or combinations thereof.

While some techniques are described herein in connection with frames, subframes, slots, or the like, or combinations thereof, these techniques may equally apply to other types of wireless communication structures, which may be referred to using terms other than "frame," "subframe," "slot," or the like, or combinations thereof in 5G NR. In some aspects, "wireless communication structure" may refer to a periodic time-bounded communication unit defined by a wireless communication standard or protocol. Additionally or alternatively, different configurations of wireless communication structures than those shown in FIG. 3A may be used.

In some telecommunications (for example, NR), a base station may transmit synchronization signals. For example, a base station may transmit a primary synchronization signal (PSS), a secondary synchronization signal (SSS), or the like, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
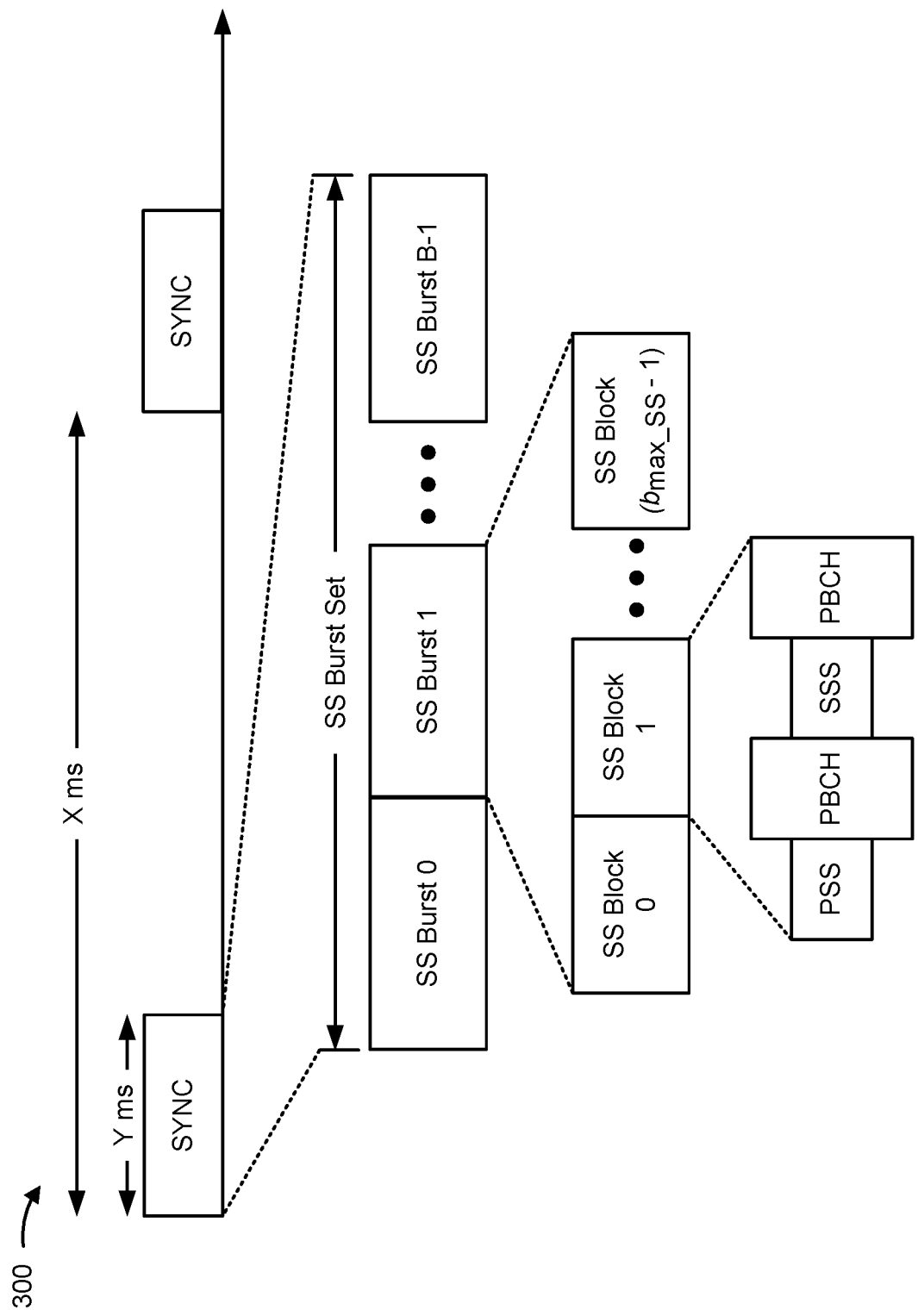
FIG. 3B is a block diagram illustrating an example synchronization communication hierarchy for use in a wireless communication network in accordance with various aspects of the present disclosure.

FIG. 3B is a block diagram illustrating an example synchronization communication hierarchy for use in a wireless communication network in accordance with various aspects of the present disclosure. The SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum quantity of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum quantity of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, or other synchronization signals (for example, a tertiary synchronization signal (TSS)) or synchronization channels. In some aspects, multiple SS blocks are included in an SS burst, and the PSS, the SSS, or the PBCH may be the same across each SS block of the SS burst. In some aspects, a single SS block may be included in an SS burst. In some aspects, the SS block may be at least four symbol periods in length, where each symbol carries one or more of the PSS (for example, occupying one symbol), the SSS (for example, occupying one symbol), or the PBCH (for example, occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some aspects, the SS bursts may have a burst period during which the SS blocks of the SS burst are transmitted by the base station in accordance with the burst period. In other words, the SS blocks may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBs) on a physical downlink shared channel (PDSCH) in some slots. The base station may transmit control information/data on a physical downlink control channel (PDCCH) in C symbol periods of a slot, where C may be configurable for each slot. The base station may transmit traffic data or other data on the PDSCH in the remaining symbol periods of each slot.

Figure 4:
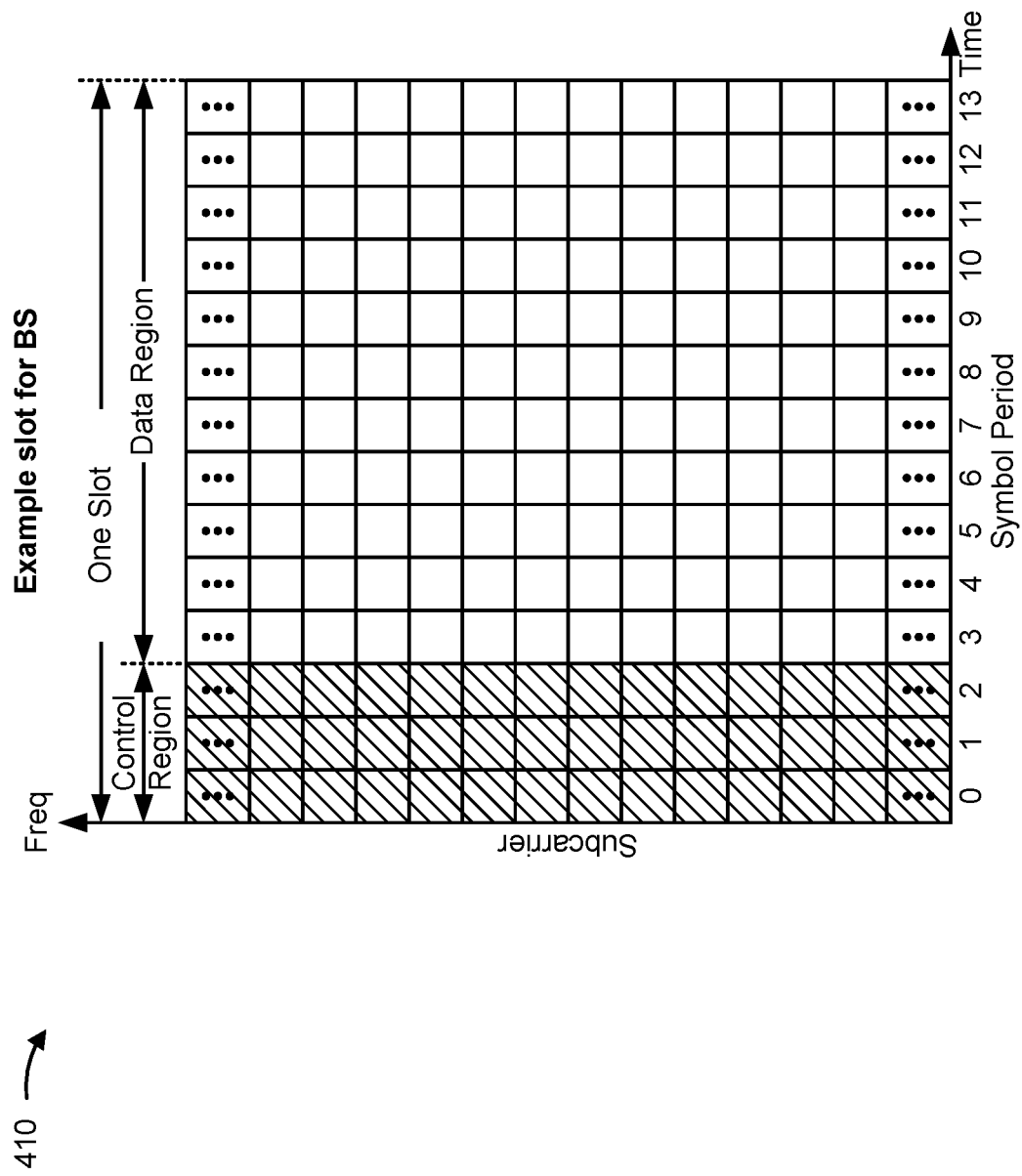
FIG. 4 is a block diagram illustrating an example slot format in accordance with various aspects of the present disclosure.

FIG. 4 is a block diagram 400 illustrating an example slot format 410 in accordance with various aspects of the present disclosure. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in some telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, or the like, or combinations thereof. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In aspects, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or DFT-s-OFDM on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such central units or distributed units.

Figure 5:
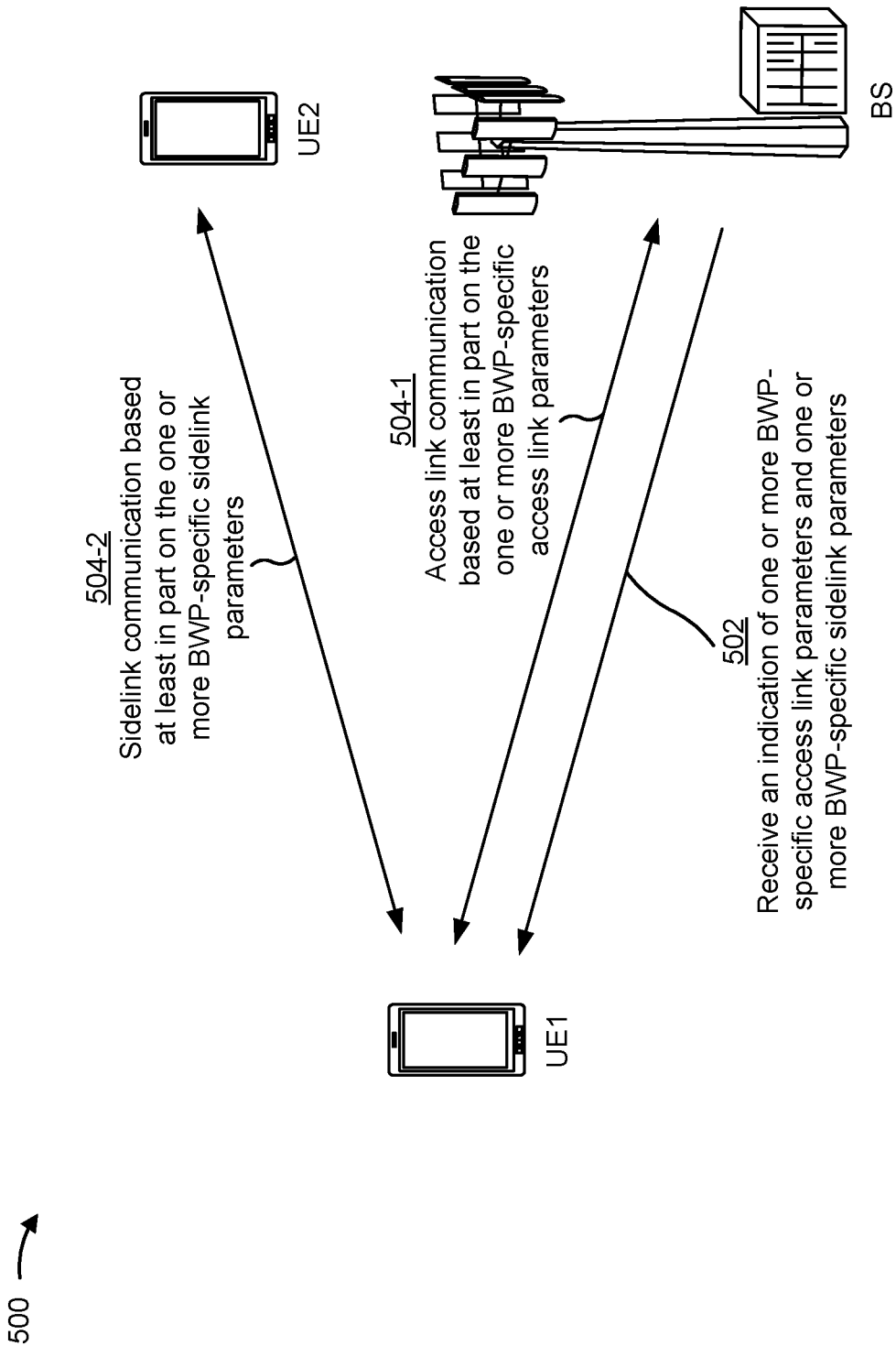
FIG. 5 is a diagram illustrating one or more examples of bandwidth part (BWP) configuration for sidelink communication in accordance with various aspects of the present disclosure.

FIG. 5 is a diagram 500 illustrating one or more examples of BWP configuration for sidelink communication in accordance with various aspects of the present disclosure. As shown in FIG. 5, the one or more examples may include sidelink communication on a sidelink between a plurality of UEs (for example, UEs 120), such as a UE1 and UE2, and access link communication on an access link between UE1 and a BS (for example, BS 110). In some aspects, a greater quantity of UEs, BSs, or a combination thereof may be included in the one or more examples.

In some aspects, the BS and the UEs may be included in a wireless network, such as wireless network 100 or another wireless network. In some aspects, the BS may be a serving BS of UE1 in the wireless network. The BS and UE1 may communicate via an access link, which may be configured with a frame structure such as frame structure 300 or another frame structure, a slot format such as slot format 410 or another slot format, or a combination thereof, among other possibilities/examples. The access link may include an uplink and a downlink. In some aspects, the UEs may be subordinate entities included in the wireless network and may communicate via a sidelink, which may be configured with a frame structure such as frame structure 300 or another frame structure, a slot format such as slot format 410 or another slot format, or a combination thereof, among other possibilities/examples.

In some cases, UE1 may communicate on the access link with the BS based at least in part on one or more cell-specific parameters associated with the BS. In some cases, the BS may configure UE1 with one or more BWP-specific parameters for communication on the access link. The one or more BWP-specific parameters may be modified versions of the cell-specific parameters, may be other parameters, or a combination thereof. This permits the BS to configure the UE with different sets of access link parameters, which may be based at least in part on capabilities of UE 1, or on operational scenarios of UE1 (such as low-power operation or idle operation), among other possibilities/examples. However, the access link BWP-specific parameters may not be optimized for, or configured in consideration of, sidelink operation of UE 1, which may result in inefficient sidelink operation.

As shown in FIG. 5, in a first operation 502, UE1 may receive an indication of one or more BWP-specific access link parameters and one or more BWP-specific sidelink parameters from the BS. In this way, UE1 may be configured with different sets of parameters for access link communication and sidelink communication. The one or more BWP-specific access link parameters may be optimized for, or configured in consideration of, access link operation of UE1, and the one or more BWP-specific sidelink parameters may be optimized for, or configured in consideration of, sidelink operation of UEL. Such optimizations or considerations may increase the efficiency of access link operation and sidelink operation of UE1 as well as increase flexibility in configuring access link operation and sidelink operation of UE1, among other possibilities.

In some aspects, the BS may transmit the indication of the one or more BWP-specific access link parameters and the one or more BWP-specific sidelink parameters to UE1 in one or more signaling communications, which may include one or more radio resource control (RRC) communications, one or more medium access control (MAC) control element (MAC-CE) communications, one or more downlink control information (DCI) communications, or a combination thereof.

In some aspects, the one or more BWP-specific access link parameters, and the one or more BWP-specific sidelink link parameters, may include various types of parameters. For example, the one or more BWP-specific access link parameters, and the one or more BWP-specific sidelink link parameters, may include a respective subcarrier spacing parameter, one or more respective reference signal parameters, a respective transport block size parameter, a respective parameter that identifies a slot format configuration, a respective synchronization signal block (SSB) periodicity parameter, a respective SSB quantity parameter, or other parameters, or a combination thereof.

In some aspects, the one or more BWP-specific access link parameters may be different from or modified from corresponding cell-specific access link parameters associated with the BS or system-wide access link parameters associated with the wireless network. For example, a cell-specific access link parameter may include an SSB periodicity parameter that specifies a first time interval for transmitting an SSB, and a BWP-specific access link parameter may specify a second time interval different from the first time interval. Similarly, the one or more BWP-specific sidelink parameters may be different from or modified from corresponding cell-specific sidelink parameters associated with the BS or system-wide sidelink parameters associated with the wireless network.

Moreover, as described above, the one or more BWP-specific sidelink parameters may be different parameters relative to the one or more BWP-specific access link parameters, may be modified versions of the one or more BWP-specific access link parameters, or a combination thereof. For example, the one or more BWP-specific access link parameters may include an SSB periodicity parameter, and the one or more BWP-specific sidelink parameters may include an SSB quantity parameter (for example, a parameter that specifies a quantity of SSBs to be transmitted). As another example, the one or more BWP-specific access link parameters may include an SSB quantity parameter that specifies a first quantity of SSBs, and the one or more BWP-specific sidelink parameters may include an SSB quantity parameter that specifies a second quantity of SSBs which may be different from the first quantity of SSBs.

As another example, the one or more cell-specific access link parameters may identify a slot format configuration for access link communication, and the one or more sidelink parameters (which may be either cell-specific or BWP-specific) may identify a possibly different slot format configuration for sidelink communication. A UE may use different sidelink BWP configurations to communicate with different sets of UEs on the sidelink. The slot format configuration for access link communication may include various access link symbol or slot indicators, such as a downlink symbol or slot indicator, an uplink symbol or slot indicator, a flexible symbol or slot indicator, or a combination thereof. A flexible symbol or slot indicator may indicate that a slot or a symbol may be used for uplink communication or downlink communication, and may be flexibly scheduled via dynamic signaling (for example, DCI signaling).

The slot format configuration for sidelink communication may include similar symbol or slot indicators. In addition, the slot format configuration for sidelink communication may include a sidelink symbol or slot indicator, which may indicate that a slot or a symbol is scheduled for sidelink communication. In some aspects, the sidelink symbol or slot indicator may be further configured into a sidelink receiver symbol or slot indicator, which may be used to identify symbols or slots that are to be used to receive sidelink communications, and a sidelink transmitter symbol or slot indicator, which may be used to identify symbols or slots that are to be used to transmit sidelink communications. The BS may be permitted to semi-statically schedule sidelink symbols and slots using the sidelink symbol or slot indicator, may be permitted to dynamically schedule sidelink symbols and slots by dynamically configuring flexible symbols and slots as sidelink symbols and slots, or a combination thereof. Additionally or alternatively, the slot format configuration for sidelink communication may indicate that only uplink slots and symbols are permitted to be used for sidelink communication. Moreover, the slot format configuration for sidelink communication may identify one or more rules for handling slot format conflicts when, for example, slot aggregation is used. Further, among the slot format configuration options described above for facilitating sidelink operation, different options may be selected for different types of sidelink transmissions (for example, synchronization signals, discovery signals, or data communication signals). For IAB deployments, additional symbol types may be introduced besides 'downlink', 'uplink', and 'flexible', for example, each of these may be qualified as being 'soft' or 'hard', depending on whether they refer to communication with an IAB donor node or child node. Such a configuration may also be used on the sidelink, for example, when there is a similar hierarchical structure in the sidelink, such as where only one of the two UEs communicating on sidelink is in coverage of an access link network. However, such a hierarchy may not always be present in all sidelink scenarios, and alternative slot-format configurations may be used.

In some aspects, the one or more BWP-specific access link parameters and the one or more BWP-specific sidelink parameters may be included in one or more BWP configurations. In this case, the BS may transmit an indication of the one or more BWP configurations to UE1. For example, the one or more BWP-specific access link parameters and the one or more BWP-specific sidelink parameters may be included in a joint or common access link and sidelink BWP configuration. As another example, the one or more BWP-specific access link parameters may be included in an access link BWP configuration, and the one or more BWP-specific sidelink parameters may be included in a separate sidelink BWP configuration.

In some aspects, the BS may configure a joint or common access link and sidelink BWP configuration, for example, if the quantity of BWP-specific sidelink parameters to be included in the BWP configuration is relatively small or does not satisfy a quantity threshold. Additionally or alternatively, in some aspects, the BS may configure a joint or common access link and sidelink BWP configuration based at least in part on a capability of UE1. For example, the BS may configure a joint or common access link and sidelink BWP configuration based at least in part on UE1 being capable of performing access link and sidelink communication concurrently or near-concurrently (for example, UE1 may be capable of fast switching between communication modes on a per-symbol or per-slot basis).

In some aspects, the BS may configure separate BWP configurations for the one or more BWP-specific access link parameters and the one or more BWP-specific sidelink parameters, for example, if the quantity of BWP-specific sidelink parameters is relatively large or satisfies a quantity threshold. Additionally or alternatively, in some aspects, the BS may configure separate BWP configurations for the one or more BWP-specific access link parameters and the one or more BWP-specific sidelink parameters based at least in part on a capability of UE1. For example, the BS may configure one or more BWP configurations for the one or more BWP-specific access link parameters and separately configure one or more BWP configurations for the one or more BWP-specific sidelink parameters based at least in part on UE1 being capable of only slow or semi-static switching between access link and sidelink communication.

In some aspects, the BS may configure and transmit an indication of a plurality of access link BWP configurations for UE1, a plurality of sidelink BWP configurations for UE1, a plurality of joint or common access link and sidelink BWP configurations for UE1, or a combination thereof. In this case, the BS may activate particular BWP configurations by transmitting an indication for UE1 to activate the particular BWP configurations. Accordingly, UE1 may activate, based at least in part on receiving an indication from the BS, one or more access link BWP configurations, one or more sidelink BWP configurations, one or more joint or common access link and sidelink BWP configurations, or a combination thereof, such that one or more BWP configurations are simultaneously active for UE1. For example, the BS may transmit an indication to simultaneously activate an access link BWP configuration and a sidelink BWP configuration. In this case, UE1 may perform access link communication based at least in part on one or more BWP-specific access link parameters included in the access link BWP configuration, and may perform sidelink communication based at least in part on one or more BWP-specific sidelink parameters included in the sidelink BWP configuration.

In some aspects, if the BS configures a plurality of access link BWP configurations for UE1, a plurality of sidelink BWP configurations for UE1, a plurality of joint or common access link and sidelink BWP configurations for UE1, or a combination thereof, each BWP configuration may include a different combination of parameters relative to other BWP configurations, a different combination of values for one or more of the parameters relative to other BWP configurations, or a combination thereof.

In some aspects, the BS may configure a quantity of BWP configurations that satisfies one or more thresholds. For example, the BS may configure a quantity of BWP configurations for UE1 such that a common maximum quantity of BWP configurations for access link BWPs associated with UE1 and sidelink BWPs associated with UE1 is satisfied. As another example, the BS may configure a quantity of BWP configurations for UE1 such that a maximum quantity of BWP configurations for access link BWPs associated with UE1 and a separate maximum quantity of BWP configurations for sidelink BWPs associated with UE1 are satisfied. As another example, the BS may configure a quantity of BWP configurations for UE1 such that a common maximum quantity or separate maximum quantities of BWP configurations for at least one of downlink BWPs associated with UE1, uplink BWPs associated with UE1, sidelink transmit BWPs associated with UE1, or sidelink receive BWPs associated with UE1 is satisfied. Moreover, the BS may configure a quantity of BWP configurations for UE1 such that the transmission rank across component carriers (CCs) associated with the access link, and the transmission rank across CCs associated with the sidelink, satisfies a rank capability threshold.

As further shown in FIG. 5, in a second operation 504, UE1 may perform at least one of access link communication with the BS based at least in part on the one or more BWP-specific access link parameters (504-1), or sidelink communication with UE2 based at least in part on the one or more BWP-specific sidelink parameters (504-2). For example, UE1 may transmit sidelink communications to UE2 based at least in part on the one or more BWP-specific sidelink parameters, may receive sidelink communications from UE2 based at least in part on the one or more BWP-specific sidelink parameters, may operate in various operating modes (for example, a power saving mode, a sleep mode, an idle mode, among other examples), based at least in part on the one or more BWP-specific sidelink parameters, or a combination thereof. In some aspects, UE1 may perform sidelink communication with UE2 based at least in part on a combination of the one or more BWP-specific access link parameters, the one or more BWP-specific sidelink parameters, or the one or more cell-specific parameters (for example, cell-specific access link or sidelink parameters). For example, UE1 may be configured to derive some BWP-specific sidelink parameters from the one or more BWP-specific or cell-specific access link parameters, and accordingly may indirectly perform sidelink communications based at least in part on the one or more BWP-specific or cell-specific access link parameters.

Accordingly, UE1 may receive an indication of one or more BWP configurations, which may include one or more BWP-specific access link parameters and one or more BWP-specific sidelink parameters. UE1 may perform access link communication based at least in part on the one or more BWP-specific access link parameters, and may perform sidelink communication based at least in part on the one or more BWP-specific sidelink parameters. In this way, UE1 may be configured with different sets of parameters for access link communication than for sidelink communication. This permits the one or more BWP-specific access link parameters to be optimized for, or configured in consideration of, access link operation of UE1, while permitting the one or more BWP-specific sidelink parameters to be optimized for, or configured in consideration of, sidelink operation of UE1., Such optimization or considerations may increase the efficiency of access link operation and sidelink operation of UE1 as well as increase flexibility in configuring access link operation and sidelink operation of UE1, among other advantages.

Figure 6:
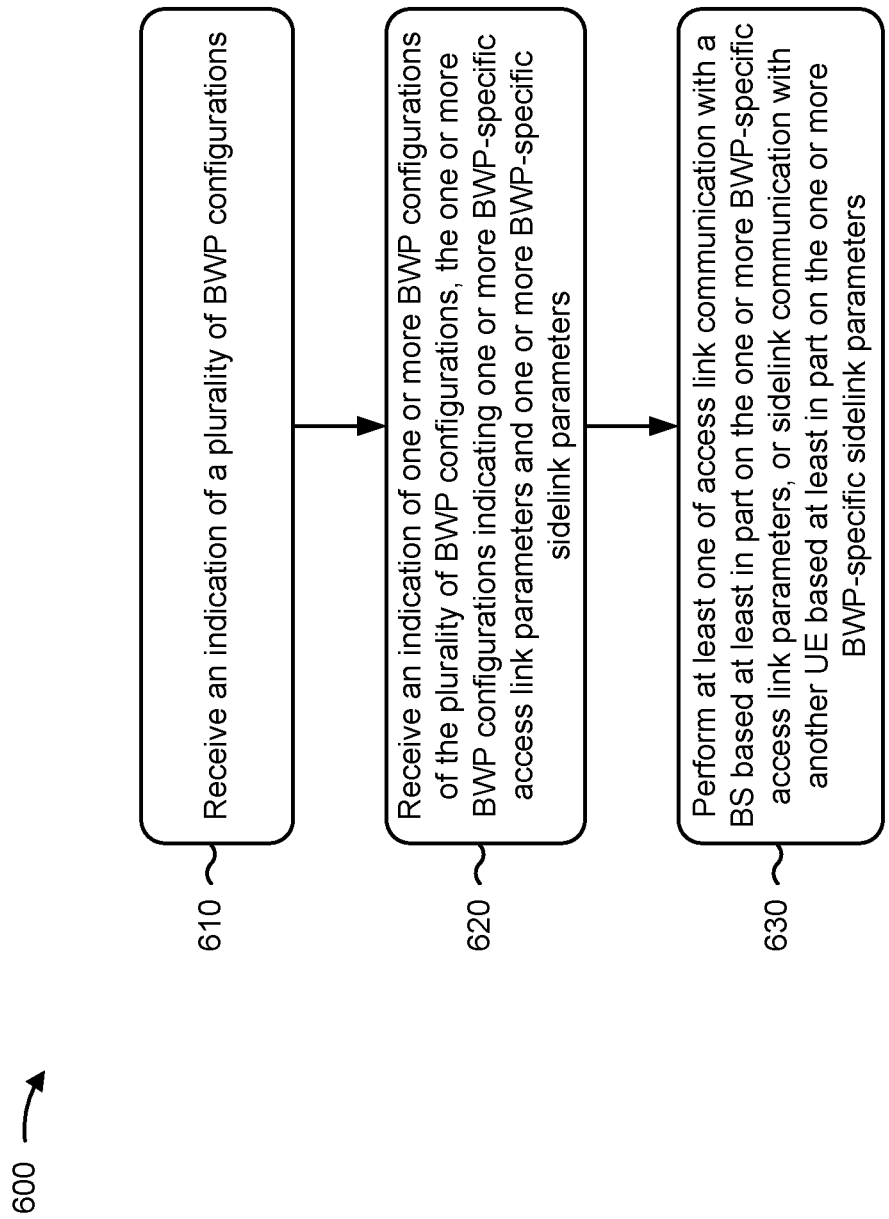
FIG. 6 is a diagram illustrating an example process performed by a UE in accordance with various aspects of the present disclosure.

FIG. 6 is a diagram illustrating an example process 600 performed, for example, by a UE, in accordance with various aspects of the present disclosure. Example process 600 is an example where a UE, such as a UE 120, performs operations associated with BWP configuration for sidelink communication.

As shown in FIG. 6, in some aspects, process 600 may include receiving an indication of a plurality of BWP configurations (block 610). For example, the UE (using receive processor 258, transmit processor 264, controller/processor 280, or memory 282, among other examples) may receive an indication of a plurality of BWP configurations, as described above.

As shown in FIG. 6, in some aspects, process 600 may include receiving an indication of one or more BWP configurations of the plurality of BWP configurations, the one or more BWP configurations indicating one or more BWP-specific access link parameters and one or more BWP-specific sidelink parameters (block 620). For example, the UE (using receive processor 258, transmit processor 264, controller/processor 280, or memory 282, among other examples) may receive an indication of one or more BWP configurations of the plurality of BWP configurations, the one or more BWP configurations indicating one or more BWP-specific access link parameters and one or more BWP-specific sidelink parameters, as described above.

As further shown in FIG. 6, in some aspects, process 600 may include performing at least one of access link communication with a BS based at least in part on the one or more BWP-specific access link parameters, or sidelink communication with another UE based at least in part on the one or more BWP-specific sidelink parameters (block 630). For example, the UE (using receive processor 258, transmit processor 264, controller/processor 280, or memory 282, among other examples) may perform at least one of access link communication with a BS based at least in part on the one or more BWP-specific access link parameters, or sidelink communication with another UE based at least in part on the one or more BWP-specific sidelink parameters, as described above.

Process 600 may include additional aspects, such as any single aspect or any combination of aspects described below and in connection with one or more other processes described elsewhere herein.

In a first aspect, the one or more BWP-specific access link parameters and the one or more BWP-specific sidelink parameters are included in a same BWP configuration of the plurality of BWP configurations. In a second additional aspect, alone or in combination with the first aspect, a quantity of the plurality of BWP configurations is based at least in part on a common maximum quantity of BWP configurations for access link BWPs associated with the UE and sidelink BWPs associated with the UE. In a third additional aspect, alone or in combination with one or more of the first and second aspects, a quantity of the plurality of BWP configurations is based at least in part on a maximum quantity of BWP configurations for access link BWPs associated with the UE, and a maximum quantity of BWP configurations for sidelink BWPs associated with the UE. In a fourth additional aspect, alone or in combination with one or more of the first through third aspects, a quantity of the plurality of BWP configurations is based at least in part on a common maximum quantity of BWP configurations for at least two of downlink BWPs associated with the UE, uplink BWPs associated with the UE, sidelink transmit BWPs associated with the UE, or sidelink receive BWPs associated with the UE.

In a fifth additional aspect, alone or in combination with one or more of the first through fourth aspects, the one or more BWP-specific access link parameters are included in an access link BWP configuration of the plurality of BWP configurations, and the one or more BWP-specific sidelink parameters are included in a separate sidelink BWP configuration of the plurality of BWP configurations. In a sixth additional aspect, alone or in combination with one or more of the first through fifth aspects, the plurality of BWP configurations includes a plurality of access link BWP configurations and a plurality of sidelink BWP configurations, a quantity of the plurality of access link BWP configurations and a quantity of the plurality of sidelink BWP configurations are based at least in part on a common maximum quantity of BWP configurations for access link BWPs associated with the UE and sidelink BWPs associated with the UE.

In a seventh additional aspect, alone or in combination with one or more of the first through sixth aspects, the plurality of BWP configurations includes a plurality of access link BWP configurations and a plurality of sidelink BWP configurations, a quantity of the plurality of access link BWP configurations is based at least in part on a maximum quantity of access link BWP configurations for access link BWPs associated with the UE and a quantity of the plurality of sidelink BWP configurations is based at least in part on a maximum quantity of sidelink BWP configurations for sidelink BWPs associated with the UE. In an eighth additional aspect, alone or in combination with one or more of the first through seventh aspects, the plurality of BWP configurations includes a plurality of access link BWP configurations and a plurality of sidelink BWP configurations, a quantity of the plurality of access link BWP configurations and a quantity of the plurality of sidelink BWP configurations are based at least in part on a common maximum quantity of BWP configurations for at least two of downlink BWPs associated with the UE, uplink BWPs associated with the UE, sidelink transmit BWPs associated with the UE, or sidelink receive BWPs associated with the UE.

In a ninth additional aspect, alone or in combination with one or more of the first through eighth aspects, receiving the indication of the one or more BWP configurations includes receiving an indication to activate the access link BWP configuration, and receiving an indication to activate the sidelink BWP configuration, such that the access link BWP configuration and the sidelink BWP configuration are simultaneously active for the UE. In a tenth additional aspect, alone or in combination with one or more of the first through ninth aspects, a first subset of the BWP-specific access link parameters and a first subset of the BWP-specific sidelink parameters are included in a joint BWP configuration, a second subset of the BWP-specific access link parameters are included in an access link BWP configuration, and a second subset of the BWP-specific sidelink parameters are included in a sidelink BWP configuration.

In an eleventh additional aspect, alone or in combination with one or more of the first through tenth aspects, combination of a transmission rank across CCs associated with an access link on which the UE performs access link communication with the BS based at least in part on the one or more BWP-specific access link parameters, and a transmission rank across CCs associated with a sidelink on which the UE performs sidelink communication with the other UE based at least in part on the one or more BWP-specific sidelink parameters, satisfies a rank capability threshold. In a twelfth additional aspect, alone or in combination with one or more of the first through eleventh aspects, the one or more BWP-specific access link parameters identify a slot format configuration for access link communication between the UE and the BS, and the one or more BWP-specific sidelink parameters identify a slot format configuration for sidelink communication between the UE and the other UE. In a thirteenth additional aspect, alone or in combination with one or more of the first through tenth aspects, the slot format configuration for sidelink communication includes a sidelink symbol indicator that identifies one or more symbols for sidelink communication.

In a fourteenth additional aspect, alone or in combination with one or more of the first through thirteenth aspects, the slot format configuration for sidelink communication includes a flexible symbol indicator that identifies one or more symbols that are permitted to be used for access link communication or sidelink communication. In a fifteenth additional aspect, alone or in combination with one or more of the first through fourteenth aspects, process 600 further includes receiving a dynamic signaling communication that configures the one or more symbols for sidelink communication.

In a sixteenth additional aspect, alone or in combination with one or more of the first through fifteenth aspects, the slot format configuration for sidelink communication includes an uplink symbol indicator that identifies one or more symbols that are permitted to be used for uplink access link communication or sidelink communication. In a seventeenth additional aspect, alone or in combination with one or more of the first through sixteenth aspects, the one or more BWP-specific sidelink parameters are different than one or more cell-specific sidelink parameters associated with the BS, and the one or more BWP-specific access link parameters are different than one or more cell-specific access link parameters associated with the BS. In an eighteenth additional aspect, alone or in combination with one or more of the first through seventeenth aspects, the one or more BWP-specific sidelink parameters are included in a sidelink BWP configuration, and include a subcarrier spacing parameter.

Figure 7:
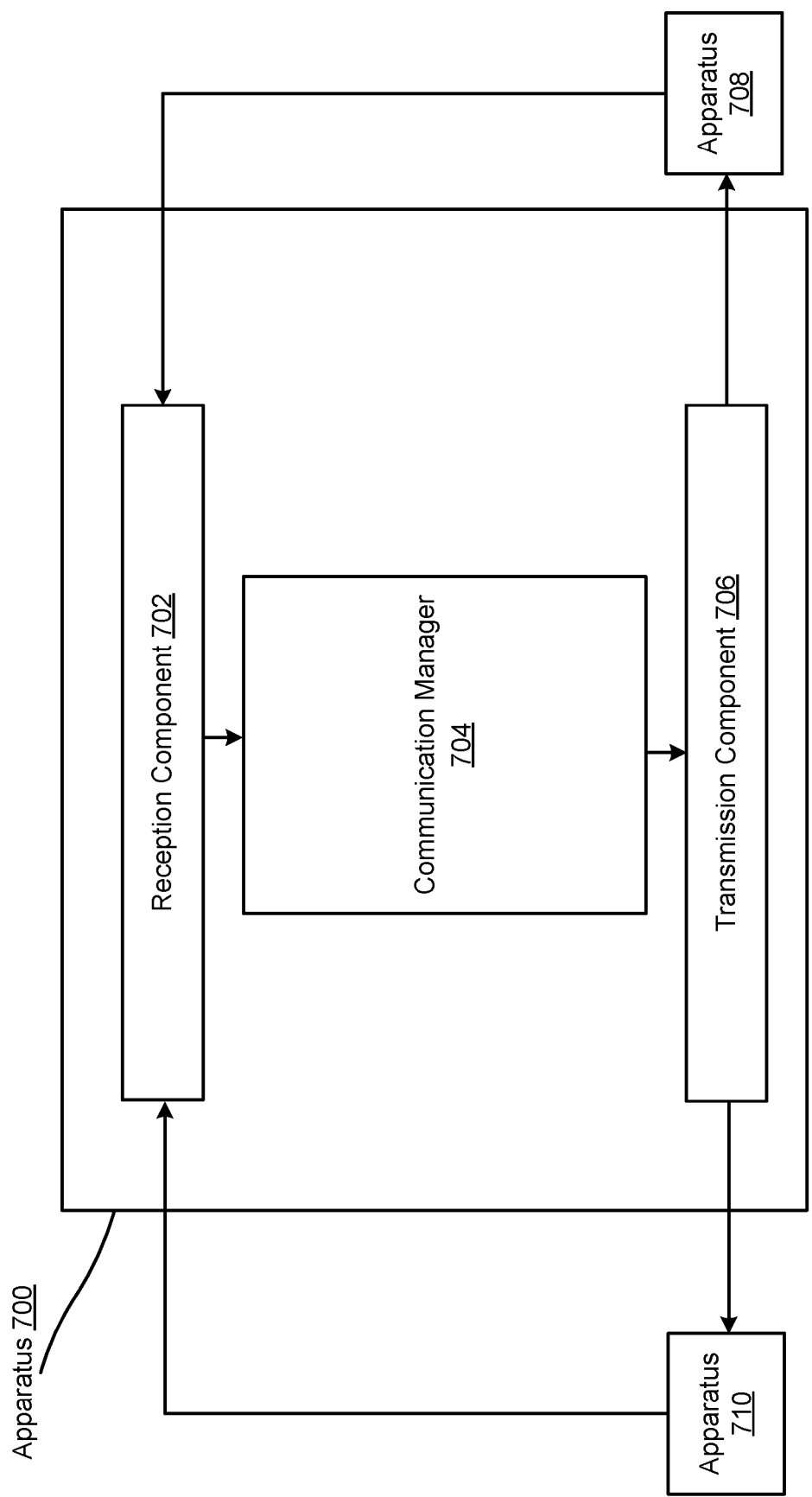
FIG. 7 is a block diagram of an example apparatus for wireless communication in accordance with various aspects of the present disclosure.

FIG. 7 is a block diagram of an example apparatus 700 for wireless communication in accordance with various aspects of the present disclosure. The apparatus 700 may be a UE 120, or a UE 120 may include the apparatus 700. In some aspects, the apparatus 700 includes a reception component 702, a communication manager 704, and a transmission component 706, which may be in communication with one another (for example, via one or more buses). As shown, the apparatus 700 may communicate with one or more other apparatuses 708 and 710 (such as a UE 120, a BS 110, or another wireless communication device) using the reception component 702 and the transmission component 706.

In some aspects, the apparatus 700 may be configured to perform one or more operations described herein in connection with FIG. 5. Additionally or alternatively, the apparatus 700 may be configured to perform process 600 of FIG. 6. In some aspects, the apparatus 700 may include one or more components of the receiver described above in connection with FIG. 2.

The reception component 702 may receive communications, such as reference signals, control information, data communications, or a combination thereof, from the apparatus 708 or the apparatus 710. The reception component 702 may receive communications on an access link, on a sidelink, or a combination thereof. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the receiver described above in connection with FIG. 2.

The transmission component 706 may transmit communications, such as reference signals, control information, data communications, or a combination thereof, to the apparatus 708 or the apparatus 710. The transmission component 706 may transmit communications on an access link, on a sidelink, or a combination thereof. In some aspects, the communication manager 704 may generate communications and may transmit the generated communications to the transmission component 706 for transmission to the apparatus 708 or the apparatus 710. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708 or the apparatus 710. In some aspects, the transmission component 706 may include one or more antennas, a modulator, a transmit MIMO processor, a transmit processor, a controller/processor, a memory, or a combination thereof, of the receiver described above in connection with FIG. 2. In some aspects, the transmission component 706 may be collocated with the reception component 702 in a transceiver.

The communication manager 704 may receive (or may cause the reception component 702 to receive) an indication of a plurality of BWP configurations. The communication manager 704 may receive (or may cause the reception component 702 to receive) an indication of one or more BWP configurations of the plurality of BWP configurations. The one or more BWP configurations may indicate one or more BWP-specific access link parameters and one or more BWP-specific sidelink parameters. The one or more BWP-specific access link parameters may be included in an access link BWP configuration, and the one or more BWP-specific sidelink parameters may be included in a separate sidelink BWP configuration. The communication manager 704 may perform (or may cause the reception component 702 and the transmission component 706 to perform) at least one of access link communication with the apparatus 708 based at least in part on the one or more BWP-specific access link parameters, or sidelink communication with the apparatus 710 based at least in part on the one or more BWP-specific sidelink parameters.

In some aspects, the communication manager 704 may include a set of components. Alternatively, the set of components may be separate and distinct from the communication manager 704. In some aspects, one or more components of the set of components may include or may be implemented within a controller/processor, a memory, a scheduler, a communication unit, or a combination thereof, of the receiver described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A user equipment (UE), comprising:
a transceiver;
one or more memories comprising instructions; and
one or more processors configured to execute the instructions and cause the UE to:
receive, via the transceiver, an indication of a plurality of bandwidth part (BWP) configurations including:
a plurality of access link BWP configurations associated with one or more BWP-specific access link parameters, and
a single sidelink BWP configuration, different from the plurality of access link BWP configurations, associated with one or more BWP-specific sidelink parameters,
wherein the one or more BWP-specific access link parameters comprise a first parameter and a second parameter, and the one or more BWP specific sidelink parameters comprise the first parameter and a third parameter different from the first parameter and the second parameter, and
wherein a quantity of the plurality of BWP configurations is based at least in part on a common maximum quantity of BWP configurations associated with one or more downlink BWPs, associated with the UE, and one or more uplink BWPs associated with the UE;
receive, via the transceiver and after receiving the indication of the plurality of BWP configurations, an indication of one or more particular BWP configurations of the plurality of BWP configurations; and
perform, after receiving the indication of the one or more particular BWP configurations, at least one of:
access link communication, with a network node, based at least in part on the one or more BWP-specific access link parameters, or
sidelink communication, with another UE, based at least in part on the one or more BWP-specific sidelink parameters.

2. The UE of claim 1, wherein the indication of the plurality of BWP configurations is received via a radio resource control (RRC) communication.

3. The UE of claim 1, wherein the one or more particular BWP configurations are at least one of the one or more access link BWP configurations.

4. The UE of claim 3, wherein the at least one of the one or more access link BWP configurations comprises at least one of a downlink BWP, of the one or more downlink BWPs, or an uplink BWP, of the one or more uplink BWPs.

5. The UE of claim 1, wherein the one or more processors, to receive the indication of the one or more particular BWP configurations, are configured to the cause the UE to:
receive an indication to activate the one or more particular BWP configurations.

6. The UE of claim 5, wherein the single sidelink BWP, and at least one of the one or more downlink BWPs or the one or more uplink BWPs, are simultaneously active.

7. The UE of claim 1, wherein the one or more BWP-specific sidelink parameters identify a slot format configuration associated with sidelink communication between the UE and the other UE.

8. The UE of claim 1, wherein the one or more BWP-specific sidelink parameters comprises a subcarrier spacing parameter.

9. A method of wireless communication performed at a user equipment (UE), comprising:
receiving an indication of a plurality of bandwidth part (BWP) configurations including:
a plurality of access link BWP configurations associated with one or more BWP-specific access link parameters, and
a single sidelink BWP configuration, different from the plurality of access link BWP configurations, associated with one or more BWP-specific sidelink parameters,
wherein the one or more BWP-specific access link parameters comprise a first parameter and a second parameter, and the one or more BWP specific sidelink parameters comprise the first parameter and a third parameter different from the first parameter and the second parameter, and
wherein a quantity of the plurality of BWP configurations is based at least in part on a common maximum quantity of BWP configurations associated with one or more downlink BWPs, associated with the UE, and one or more uplink BWPs associated with the UE;
receiving, after receiving the indication of the plurality of BWP configurations, an indication of one or more particular BWP configurations of the plurality of BWP configurations; and
performing, after receiving the indication of the one or more particular BWP configurations, at least one of:
access link communication, with a network node, based at least in part on the one or more BWP-specific access link parameters, or
sidelink communication, with another UE, based at least in part on the one or more BWP-specific sidelink parameters.

10. The method of claim 9, wherein the indication of the plurality of BWP configurations is received via a radio resource control (RRC) communication.

11. The method of claim 9, wherein the one or more particular BWP configurations are at least one of the one or more access link BWP configurations.

12. The method of claim 11, wherein the at least one of the one or more BWP access link configurations comprises at least one of a downlink BWP, of the one or more downlink BWPs, or an uplink BWP, of the one or more uplink BWPs.

13. The method of claim 9, wherein receiving the indication of the one or more particular BWP configurations comprises:
receiving an indication to activate the one or more particular BWP configurations.

14. The method of claim 13, wherein the single sidelink BWP, and at least one of the one or more downlink BWPs or the one or more uplink BWPs, are simultaneously active.

15. The method of claim 9, wherein at least one of:
the one or more BWP-specific sidelink parameters identify a slot format configuration for associated with sidelink communication between the UE and the other UE, or
the one or more BWP-specific sidelink parameters comprises a subcarrier spacing parameter.

16. A network node, comprising:
a transceiver;
one or more memories comprising instructions; and
one or more processors configured to execute the instructions and cause the network node to:
transmit, via the transceiver, an indication of a plurality of bandwidth part (BWP) configurations including:
a plurality of access link BWP configurations associated with one or more BWP-specific access link parameters, and
a single sidelink BWP configuration, different from the plurality of access link BWP configurations, associated with one or more BWP-specific sidelink parameters,
wherein the one or more BWP-specific access link parameters comprise a first parameter and a second parameter, and the one or more BWP specific sidelink parameters comprise the first parameter and a third parameter different from the first parameter and the second parameter, and
wherein a quantity of the plurality of BWP configurations is based at least in part on a common maximum quantity of BWP configurations associated one or more downlink BWPs, associated with a user equipment (UE), and one or more uplink BWPs associated with the UE;
transmit, via the transceiver and after transmitting the indication of the plurality of BWP configurations, an indication of one or more particular BWP configurations of the plurality of BWP configurations; and
perform, after transmitting the indication of the one or more particular BWP configurations, at least one of:
access link communication, with a network node, based at least in part on the one or more BWP-specific access link parameters, or
sidelink communication, with another UE, based at least in part on the one or more BWP-specific sidelink parameters.

17. The network node of claim 16, wherein the indication of the plurality of BWP configurations is transmitted via a radio resource control (RRC) communication.

18. The network node of claim 16, wherein the one or more particular BWP configurations are at least one of the one or more access link BWP configurations.

19. The network node of claim 18, wherein the at least one of the one or more access link BWP configurations comprises at least one of a downlink BWP, of the one or more downlink BWPs, or an uplink BWP, of the one or more uplink BWPs.

20. The network node of claim 16, wherein the one or more processors, to transmit the indication of the one or more particular BWP configurations, are configured to execute the instructions and cause the network node to:

transmit an indication to activate the one or more particular BWP configurations.

21. The network node of claim 20, wherein the single sidelink BWP, and at least one of the one or more downlink BWPs or the one or more uplink BWPs, are simultaneously active.

22. The network node of claim 16, wherein the one or more BWP-specific sidelink parameters identify a slot format configuration associated with sidelink communication between the UE and the other UE.

23. The network node of claim 16, wherein the one or more BWP-specific sidelink parameters comprises a subcarrier spacing parameter.

24. A method of wireless communication performed at a network node, comprising:
  transmitting an indication of a plurality of bandwidth part (BWP) configurations including:
    a plurality of access link BWP configurations, associated with one or more BWP-specific access link parameters, and
    a single sidelink BWP configuration, different from the plurality of access link BWP configurations, associated with one or more BWP-specific sidelink parameters,
    wherein the one or more BWP-specific access link parameters comprise a first parameter and a second parameter, and the one or more BWP specific sidelink parameters comprise the first parameter and a third parameter different from the first parameter and the second parameter, and
    wherein a quantity of the plurality of BWP configurations is based at least in part on a common maximum quantity of BWP configurations associated with one or more downlink BWPs, associated with a user equipment (UE), and one or more uplink BWPs associated with the UE;
  transmitting, after transmitting the indication of the plurality of BWP configurations, an indication of one or more particular BWP configurations of the plurality of BWP configurations; and
  performing, after transmitting the indication of the one or more particular BWP configurations, at least one of:
    access link communication, with a network node, based at least in part on the one or more BWP-specific access link parameters, or
    sidelink communication, with another UE, based at least in part on the one or more BWP-specific sidelink parameters.

25. The method of claim 24, wherein the indication of the plurality of BWP configurations is transmitted via a radio resource control (RRC) communication.

26. The method of claim 24, wherein the one or more particular BWP configurations are at least one of the one or more access link BWP configurations.

27. The method of claim 26, wherein the at least one of the one or more access link BWP configurations comprises at least one of a downlink BWP, of the one or more downlink BWPs, or an uplink BWP, of the one or more uplink BWPs.

28. The method of claim 24, wherein transmitting the indication of the one or more particular BWP configurations comprises:
  transmitting an indication to activate the one or more particular BWP configurations.

29. The method of claim 28, wherein the single sidelink BWP, and at least one of the one or more downlink BWPs or the one or more uplink BWPs, are simultaneously active.

30. The UE of claim 1, wherein the indication of the one or more particular BWP configurations is received via a downlink control information communication.

* * * * *